United States Patent [19]

Sheppard et al.

[11] 3,721,101
[45] March 20, 1973

[54] METHOD AND APPARATUS FOR COOLING A LOAD

[75] Inventors: John C. Sheppard, Melrose, Thomas P. Hosmer, Concord, both of Mass.

[73] Assignee: Cryogenic Technology, Inc., Waltham Mass.

[22] Filed: Jan. 28, 1971

[21] Appl. No.: 110,678

[52] U.S. Cl. .................. 62/56, 62/383, 62/55.5, 62/56, 62/100, 62/132, 62/441, 165/32, 165/96
[51] Int. Cl. .................................................. F25d
[58] Field of Search ......... 62/383, 56, 132, 55.5, 441, 62/100; 165/32, 96

[56] References Cited

UNITED STATES PATENTS

| | | | |
|---|---|---|---|
| 3,237,419 | 3/1966 | Venema | 62/56 |
| 3,364,687 | 1/1968 | Kolyn | 62/45 |
| 3,371,498 | 3/1968 | Hood | 62/45 |
| 3,423,955 | 1/1960 | Wright | 62/45 |
| 3,483,709 | 12/1969 | Baicker | 62/45 |
| 3,485,054 | 12/1969 | Hogan | 62/55.5 |
| 3,492,830 | 2/1970 | Mulder | 62/45 |

Primary Examiner—William J. Wye
Attorney—Bessie A. Lepper

[57] ABSTRACT

Method and apparatus for cooling a load such as a sample for spectroscopic analysis, an electronic component or a cryopumping surface. A constant source of cryogenic refrigeration is controllably thermally engaged with the load by externally actuated means. That part of the refrigeration system requiring insulation is contained within an evacuatable chamber while the working zone containing the load is normally contained within another separate evacuatable chamber. These chambers may be in controllable fluid communication.

39 Claims, 14 Drawing Figures

John C. Sheppard
Thomas P. Hosmer
INVENTORS

BY *Bruce A. Lepper*

Attorney

John C. Sheppard
Thomas P. Hosmer
INVENTORS

BY *Bernie A. Lepper*

Attorney

John C. Sheppard
Thomas P. Hosmer
INVENTORS

PATENTED MAR 20 1973

John C. Sheppard
Thomas P. Hosmer
INVENTORS

BY *Bruce A. Lepper*

Attorney

John C. Sheppard
Thomas P. Hosmer
INVENTORS

METHOD AND APPARATUS FOR COOLING A LOAD

This invention relates to method and apparatus for cooling a load and more particularly for rapidly cooling a load to a predetermined temperature level while the load remains insulated in a vacuum.

In making some physical measurements such as in the determination of the infrared or other wavelength spectra of a sample it is necessary to maintain the sample at a predetermined controlled cryogenic temperature. In the use of some electronic components, in particular the vary sensitive radiation detecting devices such as infrared detectors, it is necessary to be able to maintain the component at a controlled cryogenic temperature. In the establishment of a high vacuum by a technique using cryopumping it is necessary to be able to rapidly cool and maintain a cryopumping surface at a cryogenic temperature. These uses are all exemplary of applications for the apparatus of this invention. In cooling samples such as those to be examined for spectral determinations and in cooling sensitive electronic components, the samples and components as refrigeration loads must be as effectively thermally insulated as possible; and this is best accomplished by the use of a good vacuum. Hence this invention is directed to the provision of a working zone in which a refrigeration load can be rapidly cooled and maintained at a predetermined controllable low temperature in vacuum-insulated surroundings.

Cryopumping chambers are of course well known in the art, see for example U.S. Pat. Nos. 3,156,406, 3,252,652 and 3,485,054. However, these apparatus do not provide for the rapid and controllable cooling of samples contained therein. There is a need for a relatively easily handled and controlled apparatus which permits easy changing of samples, rapid cool down and evacuation while at the same time providing ready access to the sample by radiation as well as visual observation of the sample. The method and apparatus of this invention meets these requirements and hence this need.

It is therefore a primary object of this invention to provide an apparatus which permits the rapid cool down of a refrigeration load within an insulating vacuum to a predetermined temperature level and the maintaining of the load at the desired temperature for the desired period. It is another object of this invention to provide apparatus of the character described which is particularly suitable to cooling samples for spectral examination and to cooling electronic components such as sensitive detectors and the like. It is another object of this invention to provide an improved cryopumping apparatus incorporating means to controllably cool a load located within the cryopumped vacuum chamber, all controls being effected by externally located adjusting means.

It is another primary object of this invention to provide a method for cooling samples subjected to physical examination and electronic components which require that they be maintained at cryogenic temperatures for maximum performance. It is another object to provide an improved method for cooling a load while simultaneously cryopumping the working volume in which the load is located. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

In the apparatus of this invention there is provided a working zone in which the load (specimen, sample, electronic component, cryopumping surface, etc.) is maintained at a predetermined controlled low temperature in vacuum-insulated surroundings. Within a primary fluid-tight housing there is an evacuatable chamber in which the working zone is located and cryogenic refrigeration means extend into this housing. The refrigeration means, which may be a mechanical refrigerator or a circulating cryogenic fluid, is arranged to deliver refrigeration from a first heat station to one or more second heat stations in the working zone through a heat flow path which is in thermal contact with the first heat station and is adapted to make controllable thermal engagement with the second heat station or stations to control the temperature of the second heat station or stations and of a load or loads in thermal contact with the second heat station or stations. That portion of the refrigeration means which extends into the primary housing is located within an auxiliary evacuatable chamber which may be in controllable fluid communication with the evacuatable chamber in which the working zone is located. Evacuation of the evacuatable chambers may be accomplished by mechanical means or by a combination of mechanical means and cryopumping. The cryopumping surface may be located in either of the evacuatable chambers or in both of them.

For a fuller understanding of the nature and objects of the invention, reference should be had to the following detailed description taken in connection with the accompanying drawings in which.

Figure 1:
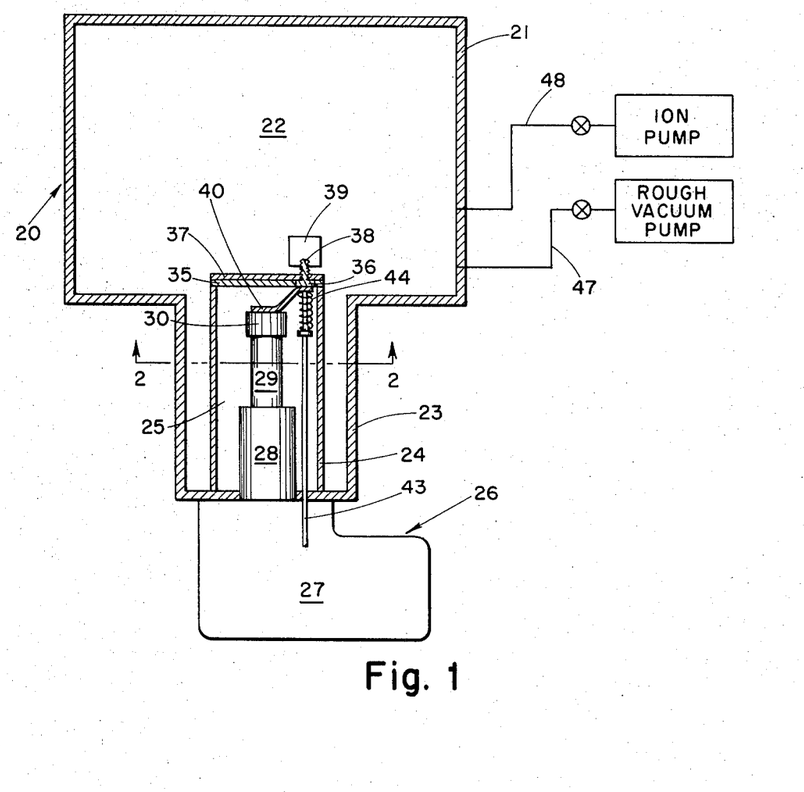
FIG. 1 is a cross section of one embodiment of the apparatus in which each evacuatable chamber is pumped separately, one by a combination of mechanical pumps and cryopump, the other by cryopumping alone.
Figure 2:
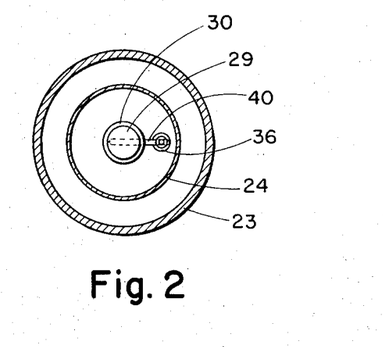
FIG. 2 is a cross section of the apparatus of FIG. 1 taken along line 2—2 of that figure.

The basic components of the apparatus are best described with reference to the somewhat simplified cross sectional drawings of FIGS. 1–4. In the apparatus of FIGS. 1 and 2, the primary fluid tight housing 20 is formed of one section 21 which defines a first evacuatable chamber 22 which is in effect the working zone and a second section 23 which contains an auxiliary internal housing 24 defining a second evacuatable chamber 25. The apparatus of FIG. 1 employs a mechanical refrigerator 26, the driving mechanism 27 of which is located externally of primary housing 20. The refrigerator 26 is a two stage refrigerator such as that described in U.S. Pat. Nos. 2,966,035, 3,188,819 and 3,218,815. The first stage 28 and second stage 29 are positioned within chamber 25, there being suitable sealing means (not shown) between the housing of stage 28 and primary housing 20. Affixed to the cold end of the second refrigerator stage 29 is a first heat station 30 adapted to deliver refrigeration from a cryogenic fluid, e.g., helium circulating in the refrigerator. The term "heat station" has now been accepted to mean a thermal mass, usually of a high heat conductivity material, which connects a refrigeration source such as an expanding fluid or evaporating cryogen to some object to be refrigerated or to an auxiliary refrigeration transfer means such as a heat transfer path to a Joule-Thomson loop or a thermal link to some refrigeration load. Heat stations suitable for this purpose are described in U.S. Pat. No. 2,966,035 and in a copending application of Fred F. Chellis and James A. O'Neil Ser. No. 807,606, now U.S. Pat. No. 3,600,903, assigned to the same assignee as the present application.

The end of the auxiliary housing 24 which extends into chamber 22 is shown to be formed of a member 35, made from a meterial such as stainless steel having a low thermal conductivity, having a plug 36 formed of copper or other high thermal conductivity material. The member 35 is covered with a second member 37 formed, like plug 36, of copper. In thermal contact with plug 36 and passing through member 37 is a copper screw 38 (or other suitably shaped member) serving as the second heat station means in the working zone 22 and to which the load 39 is thermally connected. Serving as the controllable heat flow path between the first heat station 30 and the second heat station 38 is the flexible copper strip 40 affixed to heat station 30. Copper strip 40 is engaged and disengaged with plug 36 (and hence with screw 38) by means of the rod 43 which extends externally of primary housing 20, and it is affixed to the underside of copper strip 40 through a spring 44 used to insure controllable contact between strip 40 and plug 36. The thermal conductivity of a physical contact between two surfaces in a hard vacuum is a function of the true surface area of the contact, and therefore is a function of the yield strength of the contacting materials and the normal force between the contacting surfaces. Therefore, compression of spring 44 increases the normal force between the contacting surfaces 40 and 36 to provide increasing and controllable thermal conductivity of the contact. In an alternative arrangement, the end members 35 and 37 may be combined into a single copper member in which case plug 36 is eliminated and strip 40 makes thermal contact for thermal engagement directly with the copper end member. The screw 38 may then be located anywhere in the copper end member.

In the apparatus of FIG. 1 the working volume 22 is connected through a valve-controlled line 47 to a rough vacuum pump and through a valve-controlled line 48 to an ion pump. The surface of top member 37 (or of the combination of members 35 and 37 if they are one) serves as a cryopumping surface to augment the pumping of the vacuum pump and ion pump. The auxiliary volume 25 is initially evacuated by any suitable means and during operation it is cryopumped by the condensing of gases on the cold surfaces of the heat station 30, the copper strip 40 and on the exposed surface of the end member if it is constructed entirely of copper.

Figure 3:
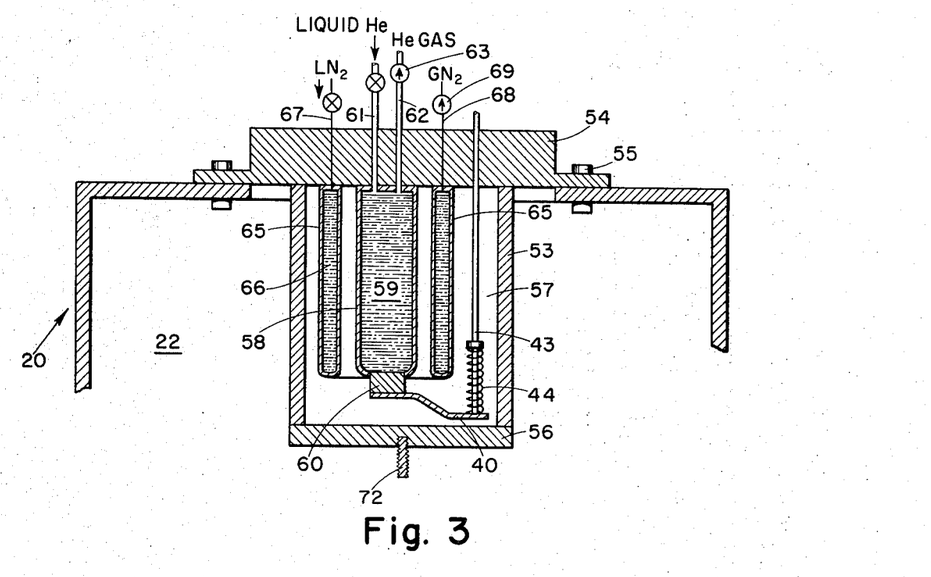
FIG. 3 illustrates the use of a cryogenic fluid as a refrigeration means in place of the mechanical refrigeration of FIG. 1.

In FIG. 3 a cryogenic fluid furnishes the required refrigeration in an apparatus similar in other respects to that of FIG. 1. In this embodiment, the refrigeration means is located in the top of the apparatus thus requiring a primary housing 20 of but a single section if desired. The auxiliary housing 53, enclosing that part of the refrigeration means extending into the primary housing, is typically formed of stainless steel and is suspended from the top of a support 54 affixed through bolts 55 to housing 20. This housing terminates in a bottom member 56 which is copper. Within the evacuated chamber 57 is a vessel 58 suitable for containing liquid helium 59 (or other cryogen). A copper mass 60 defines at least a part of the bottom of vessel 58 and serves as the first heat station. A valve-controlled insulated conduit 61 provides fluid communication between a source of liquid helium (not shown) and the interior of vessel 58. A conduit 62 having a one-way, pressure-controlled valve 63, provides for the discharge of vaporized helium from vessel 58. Around the liquid helium vessel 58 is an annularly-shaped vessel 65 for containing a liquid cryogen 66 such as nitrogen to serve as a radiation shielding for the helium vessel. The liquid nitrogen is introduced into vessel 65 by a valve-controlled conduit 67 and vaporized nitrogen gas is removed through conduit 68 having a one-way, pressure-controlled valve 69.

The heat flow path of the apparatus of FIG. 3 is essentially the same as in the apparatus of FIG. 1, the flexible copper strip 40 being thermally engageable with bottom member 56 having a suitable second heat station such as copper screw 72 in thermal contact with it. The turning of rod 43 effects controllable engagement and disengagement of the refrigerator with a load in thermal contact with screw (heat station) 72. As in the case of the apparatus of FIG. 1, both evacuatable chambers 22 and 57 are cryopumped after being mechanically pumped, the two surfaces of copper member 56 serving as the cryopumping surfaces for both chambers.

Figure 4:
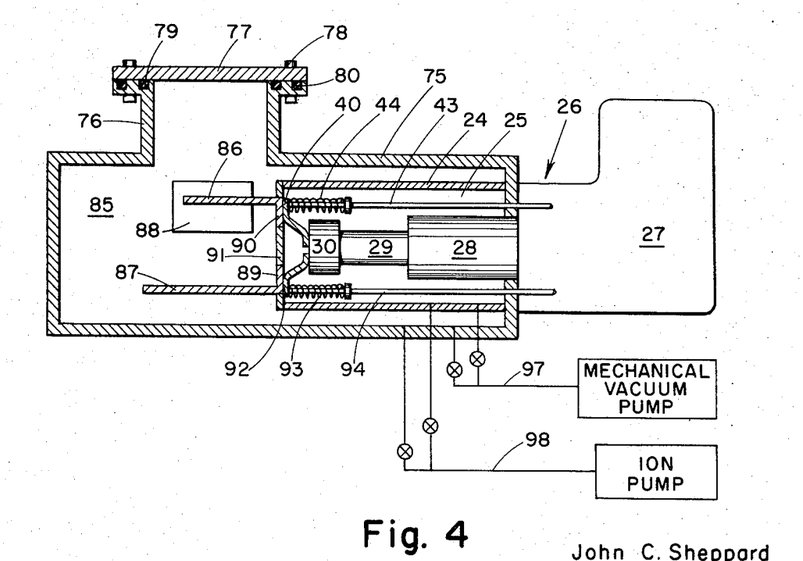
FIG. 4 is a cross section of a modification of FIG. 1 wherein two heat station means are provided in the working volume.

The apparatus of FIG. 4, in which like reference numerals refer to like components in FIG. 1 illustrates the adaptation of the basic apparatus to the use of two, or more, second heat stations located within the working zone. In this apparatus the primary housing 75 has an extension 76 which is flanged and adapted to have a removable cover 77 which may contain a window and which can be attached as by bolts 78 through suitable sealing rings 79 and 80 for easy access into working zone 85. This working zone has two heat stations 86 and 87. For purposes of illustration, heat station 86 may be a copper rod suitable for thermal engagement with a load 88 (such as an electronic component) while heat station 87 may be an extended copper surface for cryopumping. These heat stations terminate in plugs 89 and 90 which are mounted in the end member 91 formed of a low thermal conductivity material to isolate plugs 89 and 90. A second copper strip 92, in addition to copper strip 40, along with a second spring 93 and externally-extending actuating rod 94 are provided to permit separate engagement of the heat station 87 with the heat station 30 of the refrigerator.

In the particular embodiment of the apparatus of FIG. 4 it is possible first to engage heat station 87 to cryopump volume 85 before cooling the load 88 associated with heat station 86. It is also of course within the scope of this invention to locate more than two heat stations in the working zone and to join them through separate or common heat flow path means to the refrigerator. By using a plurality of heat station means and by employing two or more of them in cooling cryopumping surfaces it is possible to cryopump in stages, using additional surfaces as the pressure in the working chamber decreases. In addition to cryopumping, means are provided to first pump down both chambers 25 and 85 by mechanical and ion pumps through suitable valved-controlled lines 97 and 98.

Figure 5:
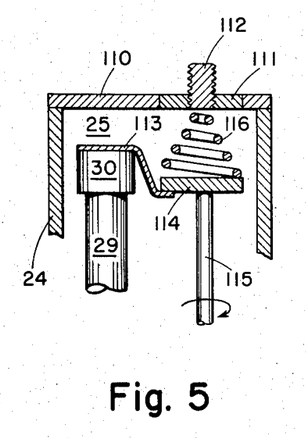
FIGS. 5–7 illustrate the use of a flexible strap and spring as a heat flow path.
Figure 6:
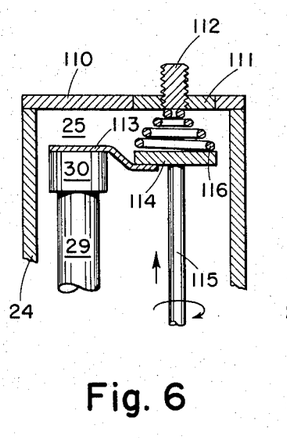
Figure 7:
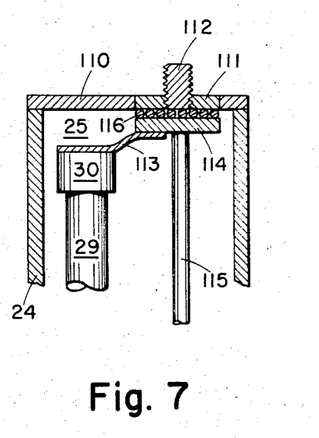

FIGS. 5-7 illustrate a modification of the heat flow path wherein it is possible to vary the actual temperature of the refrigeration load in the working zone. In these figures like reference numerals are used to refer to like components in FIG. 1. The end member 110 of auxiliary housing 24 is formed of a low heat conductivity material at cryogenic temperatures, such as stainless steel, and it has in it a copper plug 111 (of any desired configuration) which in turn has a copper screw 112 serving as the heat station in the working zone. A copper strap 113 is affixed to heat station 30 and is designed to make continual contact with a copper spring support 114 mounted on a rod 115 which is externally actuatable. A beryllium copper spiral spring 116 is affixed to spring support 114. When, as in FIG. 5, the spring support is in a position to prevent contact of the spring with copper plug 111, no refrigeration is delivered to the load which is in thermal contact with screw 112. Then as the rod 115 is moved, as in FIG. 6, the inner coil of the spring makes contact and finally, as in FIG. 7, all of the spring coils are brought into contact with the copper plug to deliver the full amount of refrigeration to the load. Thus by controlling the position of spring support 114 by turning rod 115, it is possible to control the normal force between the ends of the spring and surfaces on parts 111 and 114 thereby increasing the thermal conductivity of the contacting surfaces. This in turn effectively shortens the thermal path length between surfaces 111 and 114 thereby increasing the thermal conductivity of the thermal path. Thus for a given refrigeration load, the temperature difference between the two heat stations may be controlled and therefore the temperature of the load attached to the second heat station 111 may be controlled.

Figure 8:
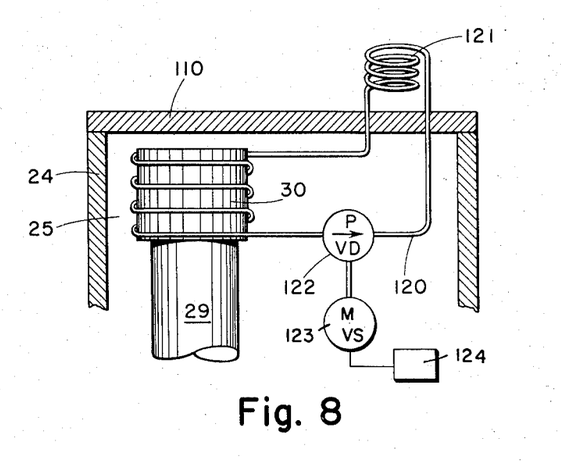
FIG. 8 illustrate the use of circulating high-pressure helium as a heat flow path.

FIG. 8 illustrates the use of circulating high-pressure helium as another flow path means which is capable of controlling the temperature of the load. The helium is circulated in a coil 120 which is wrapped around heat station 30 of the refrigerator and, if desired, is formed into a spiral winding 121 within the work chamber to provide the heat station there for delivering refrigeration to a load. Circulation of the helium is accomplished through a circulating pump 122, the speed of which is used to control the temperature of the load through the use of any well-known device such as a variable-speed electric motor 123 controlled by a temperature regulator 124 as shown in FIG. 8.

FIGS. 9-14 illustrate in detail the application of the basic apparatus to specific devices, primarily for cooling electronic detectors and samples for spectroscopic examination.

Figures 9, 10:
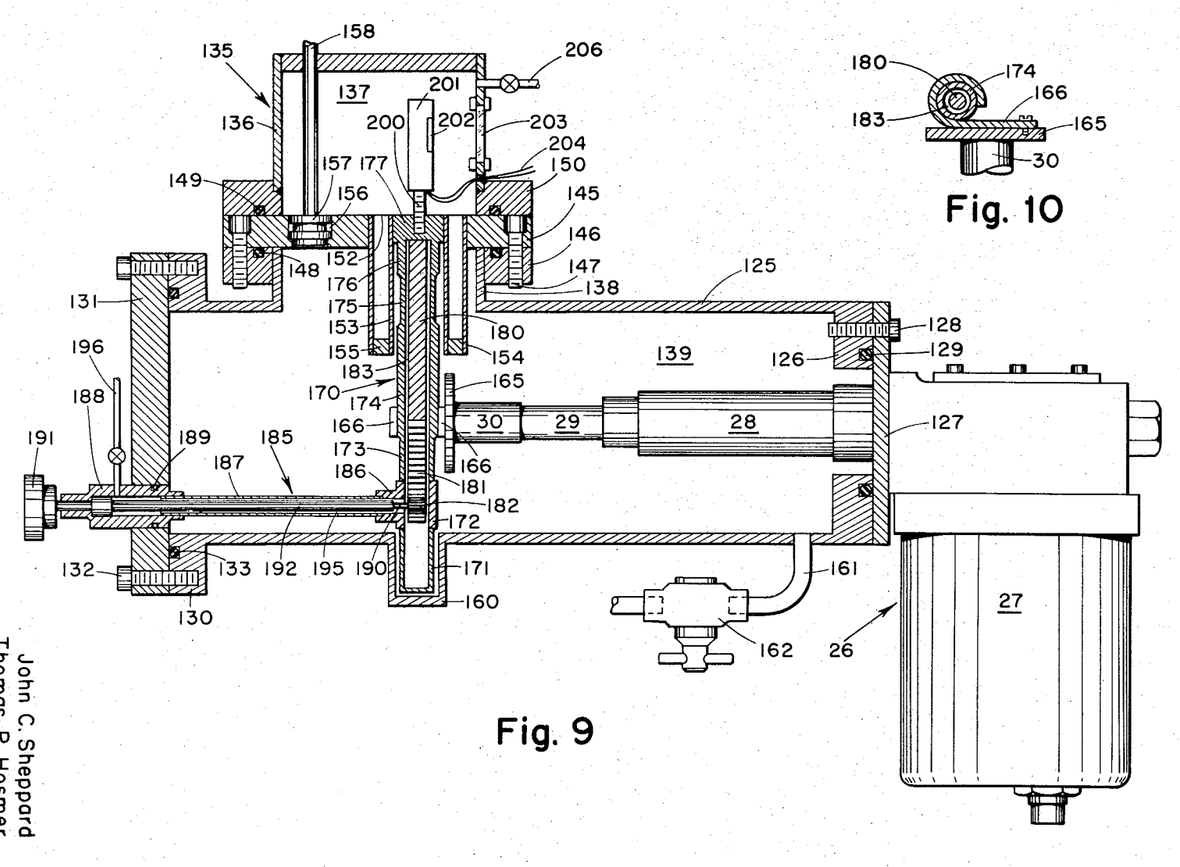
FIG. 9 is a cross section of another embodiment of the apparatus of this invention in which the two evacuatable chambers may be put in fluid communication with each other and in which cryopumping within the auxiliary evacuatable chamber supplements mechanical pumping.
FIG. 10 is a detail drawing of the thermal switch of the apparatus of FIG. 9.

The apparatus of FIG. 9 is shown in a suitable embodiment for cooling an infrared detector. The primary fluid-tight housing is formed of an essentially cylindrical main section 125 having an inwardly turned flange 126 at one end to which an end plate 127 is affixed through bolts 128 and sealed through ring 129, and having an outwardly turned flange 130 at the other end to which the other end plate 131 is affixed through bolts 132 and sealed through ring 133. Affixed to the main cylindrical section 125 is a second cylindrical section 135 formed in two parts. The upper part 136 of section 135 provides the first evacuatable chamber 137 containing the working zone; while the lower part 138 of section 135 is an extension of chamber 139 housing that portion of refrigerator 26 which extends into the primary housing. Thus in the embodiment of FIG. 9, a portion of the primary housing means serves also as the auxiliary housing means.

Chamber 137 is isolated from chamber 139 by means of the relatively thick wall member 145 affixed to a lower collar 146 through bolts 147 and sealed thereto by sealing ring 148. The wall 145 is sealed through sealing ring 149 to an upper collar 150 which in turn is welded to section 136 of the housing. The wall member 145 has an opening 152 into which is soldered a cylindrical well formed of an inner cylindrical tubing 153 and an outer cylindrical tubing 154 which are held in concentric spaced relationship by means of an annular end plug 155. The purpose of this configuration is to provide thermal insulation for the components making up the heat flow path. The wall member has a second opening 156 into which a valve plug 157 can be inserted by movement of the rod 158 which extends externally of chamber 137 through the wall of section 136 through suitable sealing means not shown. Movement of rod 158 upwardly or downwardly opens or closes a fluid connection by way of opening 156 between the two chambers.

The cylindrical housing 125 is also shown to have an extension 160 to accommodate a portion of the flow path actuator and to have a line 161 communicating with a mechanical vacuum pump (not shown) through a valve 162.

A mechanical refrigerator, similar to that shown in FIG. 1, is used in the apparatus of FIG. 9. A flat copper disk 165 is affixed to the heat station 30 of the refrigerator. To this copper disk is screwed (or otherwise attached) a copper strap 166 (FIG. 10) which is configured to wrap around the outer surface of a portion of the wall of a fluid-tight cylinder forming a part of the heat flow path. This fluid-tight cylinder is generally indicated by the reference number 170. Beginning at the bottom end (so designated only for reference) it will be seen to comprise a rack housing section 171, a T-joint section 172 providing communication with another cylinder to be described, a thin-walled stainless steel section 173, a relatively thick-walled copper section 174, another thin-walled stainless steel section 175, a second relatively thick-walled copper section 176 and a solid copper plug section 177 which is sealed to the inner wall of cylindrical tubing 153. Within cylinder 170 is a copper plunger 180 attached to a rack 181 which engages pinion 182 for movement of the copper plunger within the cylinder volume. The plunger defines a narrow annular spacing 183 with the inner wall of the cylinder.

A second fluid-tight cylinder 185 is connected with cylinder 170 through a fluid-tight T-joint 186. This cylinder 185 is formed of a tubing 187 which in turn is connected to a heavy tubing member 188 which extends through end plate 131 and makes a seal therewith through sealing ring 189. A pinion rod 190 connects pinion 182 with a hand actuated knob 191 located externally of the evacuated chamber. The pinion rod is encased in a rod casing 192 and sealing means (not shown) are provided to form the necessary seal around the rod. Rod casing 192 and the inner wall of cylinder 185 define an annular spacing 195 which is connected through a valved-controlled conduit 196 to a source of high-pressure helium (not shown) and to the annular spacing 183 within cylinder 170. The void volumes of cylinders 170 and 185 are filled with high-pressure (e.g., 5 atmospheres) helium.

The heat station within the work zone is shown to be a copper screw 200 which penetrates into copper plug 177 and to which an electronic detector 201, e.g., an infrared detector, is attached as a refrigeration load. The detector is positioned so that its radiation sensitive component 202 faces a window 203 sealed in the wall of housing section 136. Lead wires 204 to the detector are brought through this wall for connection to electronic equipment. A valve-controlled vacuum release line 206 is provided to break the vacuum in chamber 137.

In the initial operation of the apparatus of FIG. 9 the electronic component 201 is put in place and the upper part 136 of housing section 135 is connected to the remaining sections of the primary housing as indicated. Rod 158 is then pulled upwardly to provide fluid communication between chambers 137 and 139. The entire volume within the fluid tight housing is then pumped down by opening valve 162 to the mechanical vacuum pump. During this part of the operation the refrigerator is started up and copper plunger 180 is completely withdrawn from engagement with copper plug section 177. This means that the high-pressure helium occupying the void volumes within cylinders 170 and 185 provides thermal insulation between the copper plunger and copper plug and no refrigeration is delivered to the load 201 by way of the heat station screw 200. When the pressure in the two volumes has been reduced to a predetermined level by mechanical pumping (typically to about 1 torr), valve 162 is closed and cryopumping on the surface of disk 165 and on the surfaces of copper sections 174 and 176 of cylinder 170 begins, and it is continuned until the desired vacuum is attained. Knob 191 is then turned to advance the copper plunger 180 toward the copper plug. The distance between the copper plunger and the copper plug is used to predetermine the thermal conductivity between heat station 30 and heat station 200 and hence the temperature of the electronic detector 201. Thus as this distance is decreased, the temperature of the electronic detector becomes lower until contact between plunger 180 and plug 177 results in the lowest temperature. When it is desired to remove the load from the working volume the plunger 180 is completely withdrawn from the plug to cut off refrigeration to the load. Then, it is desired to repressurize only chamber 137 and the valve plug is returned to its closed position to isolate chamber 137 from chamber 139, and the vacuum release line 206 is opened. The upper housing 136 of working chamber 137 may then be taken off and the detector removed. A different load may then be connected to heat station 200 which will be at room temperature. The upper housing 136 is then replaced and valve 157 is opened. The gas in working chamber 137 is cryopumped entirely by the cryopumping surfaces in chamber 139. After a satisfactory vacuum is attained in chamber 137 the thermal link is activated by moving plunger 180 to the required position to establish the desired temperature of the new load. By this type of operation it can be seen that a variety of load samples may be rapidly interchanged without any distrubance of the cryogenic equipment.

If a cryopanel, as indicated by 39 in FIG. 1, is the load it may be in the form of a small thermal mass, for example a few square inches of thin copper foil. Such a thermal mass as this will warm up rapidly to room temperature when exposed to ambient conditions, and no appreciable amount of moisture will condense on it. However, when the working zone is again preevacuated to about the 1 torr level, such a small thermal mass can be almost immediately cooled to cryopumping temperatures when thermal contact is effected with the heat station of the refrigerator. This means that the normally employed large high-vacuum insolation valve required in conventional cryopumping apparatus can be eliminated.

Figures 11, 12:
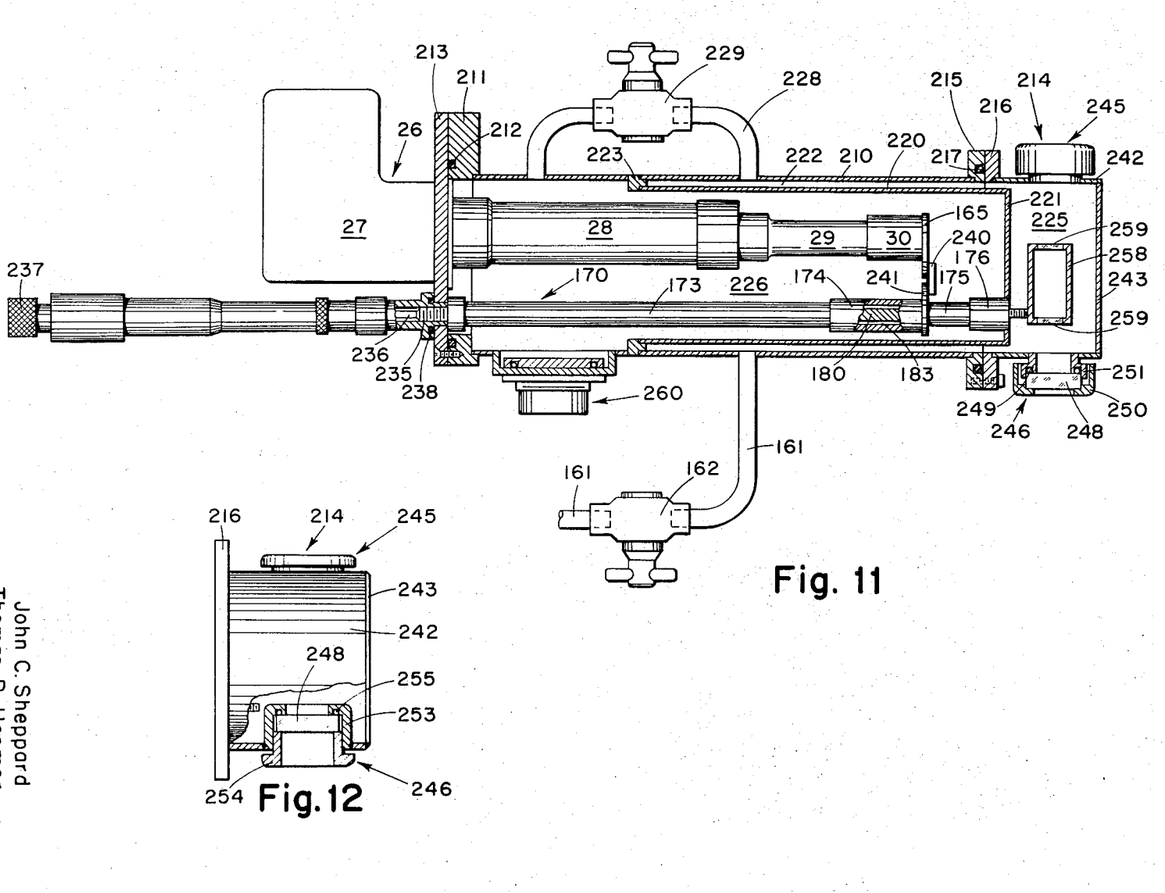
FIG. 11 is another embodiment of the apparatus of this invention showing a windowed spectroscopy sample holder as the working volume.
FIG. 12 illustrates a modification of the windowed spectroscopy holder of FIG. 11.

The apparatus of FIG. 11 is designed to cool a sample for spectroscopic examination. In this apparatus like reference numerals refer to like apparatus components in FIGS. 9 and 10. In this apparatus, the primary housing comprises an outer cylindrical section 210 closed on one end by a flange 211 sealed through sealing ring 212 to a refrigerator support plate 213 and closed on the other end by the spectroscopic sample housing 214 removably sealed to the cylindrical section through flanges 215 and 216 and a sealing ring 217. Within the outer cylindrical section 210 and extending throughout a portion of its length on the refrigerator end and slightly beyond it on the sample housing end is an inner cylindrical wall 220 sealed by an end member 221. The annular spacing 222 defined between the two concentric cylindrical walls 210 and 220 is sealed off by an annular plug 223, thus isolating the evacuatable chamber 225 in which the working zone is located from evacuatable chamber 226 into which the refrigerator extends. Fluid communication between chambers 225 and 226 is possible through conduit 228 having a valve 229.

Cylinder 170 is formed in the same manner as shown in cross sectional detail in FIG. 9. The copper plunger within the cylinder is moved back and forth by means of a screw arrangement comprising a screw 235 attached to a rod 236 which may be turned by a knob 237, all arranged in conventional fashion and sealed through ring 238 to maintain the fluid-tight character of the housing. The copper disk 165 on the heat station 30 of the refrigerator is thermally connected through a copper connecting piece 240 to a copper disk 241 affixed to the copper section 174 of the cylinder 170. The connecting piece 240 and disk 241 thus serve the same function as the copper strap 166 of FIG. 10.

The spectroscopic sample housing 214 is formed of a cylindrical section 242, of the same diameter as outer cylinder 210, closed on one end by end member 243 and adapted for fluid-tight connection to cylinder 210 through the flanges 215 and 216. The sample housing 214 has at least two opposed window systems 245 and 246, each of which is formed of a window 248 (transparent to the radiation to be used) held sealed by ring 249 between a cap piece 250 and a mounting piece 251.

FIG. 12 illustrates another embodiment of the window systems 245 and 246. In this arrangement the window 248 is positioned within the sample housing by being held in a recessed mount 253 by a cap 254 and sealed thereto by sealing ring 255. Returning to FIG. 11, it will be seen that the sample to be spectroscopically examined may, if desired be placed in an enclosed sample holder 258 having opposed windows 259. Finally, the apparatus of FIG. 11 illustrates a sealed electric lead-through assembly 260 constructed in accordance with well-known practice.

The operation of the apparatus of FIG. 11 is essentially the same as that of the apparatus of FIG. 9. Thermal switching or engagement of the refrigerator heat station 30 with the work zone heat station 200 is through the operation of the plunger 180 by means of screw knob 237. Cryopumping takes place on the copper disks 165 and 241 and on the copper connector piece 240 as well as on the exposed surface of the copper plug section 176. Rough pumping of both of the chambers 225 and 226 is accomplished by a mechanical pump connected to conduit 161 while valve 229 is opened, this latter valve serving the same function a valve plug 159 of FIG. 9.

Figures 13, 14:
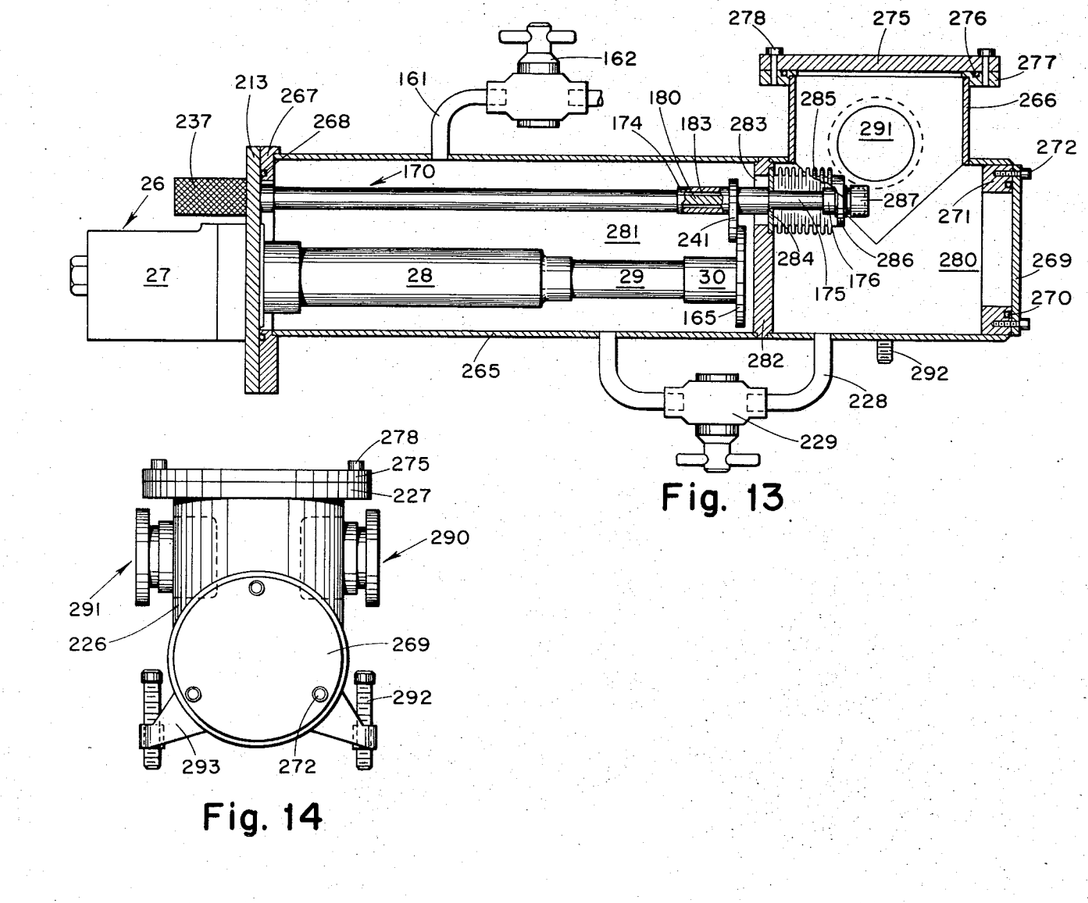
FIG. 13 is another embodiment of the apparatus of this invention showing a modification of the chamber arrangements, as well as of the way in which the working zone is positioned within the apparatus.
FIG. 14 is an end view of the apparatus of FIG. 13.

The apparatus illustrated in FIGS. 13 and 14 provides a working zone chamber which is permanently attached to the auxiliary chamber, but which can be opened either on top or on the end for ready access to the working zone. The fluid-tight housing comprises the main cylindrical section 265 and the secondary cylindrical section 266 affixed thereto and providing the actual working zone. The main cylinder section 265 is sealed at one end through flange 267 and sealing ring 268 to the refrigerator support plate 213 and at the other end by the removable end plate 269 sealable through sealing ring 270 to an internal annular member 271 by means of bolts 272. The secondary cylindrical section 266 is closed on top by a removable cover piece 275 sealed by sealing ring 276 to an external flange 277 by means of bolts 278. The evacuatable chamber 280 in which the working zone is located is separated from the evacuatable chamber 281 into which the refrigerator extends by a relatively thick wall 282 having an opening 283 through which cylinder 170 extends from chamber 281 into chamber 280. A stainless steel ring 284 is placed over the opening to support cylinder 170 and to provide a base to attach the thin-walled stainless steel bellows 285. The other end of these bellows is attached to a copper collar 286 mounted on plug 176. The bellows 285 provide a fluid-tight seal around opening 283, give some flexibility to the movement of the cold end of cylinder 170 brought about through thermal expansion and contraction and provide a much extended heat flow path to isolate the cold heat station shown as copper cap 287 from the relatively warm wall 282 and from the housing in which it is mounted.

The means for controlling the temperature of heat station 287 is the same as that in the apparatus of FIG. 11 except that direct thermal contact is made between the two copper disks 165 and 241 which also serve as cryopumping surfaces.

As will be seen from the end view in FIG. 14 the secondary cylindrical section 266 has two opposed window systems 290 and 291 which may be constructed as shown in FIG. 11 or FIG. 12. Mounting screws 292 which engage threads in legs 293 provide a means for mounting the apparatus if desired. It is also possible to locate a window system in cover piece 275 or to place windows anywhere in the housing of the apparatus to meet the demands of any optical system used.

The operation of the apparatus of FIGS. 13 and 14 is identical to that for the apparatus of FIG. 11 and therefore need not be further described.

Under some circumstances it may not be necessary to contain the refrigeration load in vacuum-insulated surroundings. For example in the apparatus of FIG. 9, the valve plug 157 may be retained in its closed position or the opening 156 and valve plug 157 may be omitted, and the upper part 136 of housing section 135 may be left off. This in effect would expose the load to ambient conditions. Alternatively, a suitable protective shield which did not define an evacuatable chamber could be placed around the refrigeration load.

It is within the scope of this invention to use any suitable refrigeration system so long as it is adapted to supply refrigeration to a heat station. Thus mechanical refrigerators based on the Stirling cycle (such as disclosed in U.S. Pat. No. 2,657,553) on the Vuilleumier cycle (see U.S. Pat. No. 1,275,507) or the modified Taconis cycle (see U.S. Pat. No. 2,567,454) or on any other suitable cycle may be used in any of the embodiments illustrated. The cryogenic refrigeration system of FIG. 3, is also applicable to these embodiments. It will be apparent that many different heat flow path means, actuating means, including electrical, magnetic, mechanical, etc., are possible. Any of the embodiments shown may have two or more heat stations within the work zone as illustrated in FIG. 4. Although the housing means have generally been described as cylindrical this term is used to define an exemplary cross sectional configuration and it is not meant to limit the housing cross sections in any of the embodiments to those which are circular.

It will be seen from the above detailed description that the apparatus of this invention is relatively simple to construct and easy to operate. Simple calibrations for the actuating means can be used to determine the temperature of the load in the working zone. By providing vacuum insulation in both of the chambers it is possible to cool a load very rapidly with little loss of the refrigeration capacity of the refrigeration means to the non-refrigerated parts of the apparatus or to the surroundings. This is the result of having a refrigeration source that remains continuously cold with a continuous thermal inertia in its separate evacuated chamber. It is only necessary to connect this refrigeration source to the load by a type of thermal switch (FIGS. 1–4) or by a variable-value thermal link (FIGS. 5–14).

It will thus be seen that the objects set forth above, among those made apparent from the preceding description, are efficiently attained; and since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. An apparatus for providing a working zone in which a refrigeration load can be maintained at a predetermined controllable low temperature in vacuum-insulated surroundings, comprising in combination
   a. primary fluid-tight housing means incorporating within it a first evacuatable chamber in which said working zone is located;
   b. cryogenic refrigeration means extending into said primary housing means and being adapted to deliver refrigeration from a first heat station means;
   c. auxiliary housing means, within said primary housing means, defining around the portion of said refrigeration means which extends into said housing means a second evacuatable chamber;
   d. second heat station means within said working zone;
   e. pumping means adapted to evacuate said first evacuatable chamber;
   f. heat flow path means in fixed thermal contact with said first heat station means of said refrigeration means and adapted to make controllable thermal engagement with said second heat station means thereby to control the temperature of said second heat station means and of a load in thermal contact therewith; and
   g. actuating means adapted to effect the controlled thermal engagement of said heat flow path means with said second heat station means.

2. An apparatus in accordance with claim 1 wherein said primary fluid-tight housing means has window system means positioned so that radiation transmitted therethrough reaches said working zone.

3. An apparatus in accordance with claim 2 wherein said window system means comprises a plurality of window systems and said working zone is adapted to contain a sample in optical alignment with said window systems for spectrographic analysis.

4. An apparatus in accordance with claim 1 wherein said cryogenic refrigeration means comprises a mechanical cryogenic refrigerator.

5. An apparatus in accordance with claim 1 wherein said cryogenic refrigeration means comprises means to provide a liquefied cryogen.

6. An apparatus in accordance with claim 5 including radiation shielding means substantially surrounding said means to provide said liquefied cryogen.

7. An apparatus in accordance with claim 1 wherein a portion of said primary fluid-tight housing means also comprises at least a portion of said auxiliary housing means.

8. An apparatus in accordance with claim 1 including valve-controlled fluid communication means between said first and second evacuatable chambers.

9. An apparatus in accordance with claim 8 wherein said valve-controlled fluid communication means are located external of said primary fluid-tight housing means.

10. An apparatus in accordance with claim 8 wherein said first and second evacuatable chambers are isolated by a wall and said valved-controlled fluid communication means comprise an opening in said wall and a valve plug operable within said opening.

11. An apparatus in accordance with claim 1 wherein said second heat station means comprises a screw member adapted for engagement with said refrigeration load.

12. An apparatus in accordance with claim 1 wherein said second heat station means comprises a flat surface.

13. An apparatus in accordance with claim 1 wherein said second heat station means comprises tubing adapted for the circulation of a liquid cryogen therethrough.

14. An apparatus in accordance with claim 1 wherein said pumping means adapted to evacuate said first evacuatable chamber comprises mechanical and cryopumping means.

15. An apparatus in accordance with claim 1 including pumping means adapted to evacuate said second evacuatable chamber.

16. An apparatus in accordance with claim 15 wherein said pumping means adapted to evacuate said second evacuatable chamber serves also as said pumping means adapted to evacuate said first evacuatable chamber.

17. An apparatus in accordance with claim 16 wherein said pumping means adapted to evacuate said second evacuatable chamber comprises mechanical and cryopumping means.

18. An apparatus in accordance with claim 1 wherein said flow path means comprises a flexible copper strip adapted for engagement with and disengagement from said second heat station and said actuating means comprises means to effect such engagement and disengagement.

19. An apparatus in accordance with claim 1 wherein said flow path means comprises a copper strip attached to said first heat station means, a spring support in thermal contact with said copper strip, a helical spring affixed to said spring support, and a copper disk to which said second heat station means is affixed; and said actuating means comprises means to move said spring support whereby a controlled number of the coils of said spring may be brought into contact with said disk.

20. An apparatus in accordance with claim 1 wherein said flow path means comprises a closed tubing adapted for circulation of pressurized helium and pump means to circulate said helium therethrough at a variable rate; and said actuating means comprises means to control the speed of said pump means.

21. An apparatus in accordance with claim 1 wherein said flow path means comprises
   1. a fluid-tight cylindrical member, the wall of which is alternately formed of relatively thick cylindrical sections of a first material having relatively high thermal conductivity at cryogenic temperatures and of relatively thin cylindrical sections of a second material having relatively low thermal conductivity at cryogenic temperatures, said fluid-tight cylindrical member terminating in a solid plug of said first material on which said second heat station means is mounted;
   2. a movable plunger within said fluid tight cylinder member and defining with the inner wall of said cylindrical member a narrow annular spacing;
   3. pressurized helium filling the void volume of said cylindrical member; and
   4. thermal connection means between said first heat station of said refrigerator means and one of said relative thick cylindrical sections of said cylindrical member; and wherein said actuating means comprises
   5. means to move said plunger within said cylindrical member, the distance between the end of said plunger and the internal surface of said plug being used to control the temperature of said second heat station means.

22. An apparatus in accordance with claim 1 wherein said second heat station means comprises a plurality of separate heat stations separately in controllable thermal engagement with said first heat station means.

23. An apparatus for providing a working zone in which a refrigeration load can be maintained at a predetermined controllable low temperature in vacuum-insulated surroundings, comprising in combination
   a. fluid-tight housing means;
   b. wall means within said housing means defining therein first and second evacuatable chambers;
   c. refrigeration-load heat station means located within said first evacuatable chamber;
   d. cryogenic refrigeration means extending into said second evacuatable chamber and having a refrigerator heat station;
   e. vacuum pumping means adapted to evacuate said first and second evacuatable chambers;
   f. thermal switch means intersecting said wall means and in fixed thermal contact with said refrigerator heat station and adapted to make controllable thermal engagement with said refrigeration-load heat station means and a load in thermal contact therewith; and
   g. actuating means adapted to effect the controlled thermal engagement of said thermal switch means with said refrigeration-load heat station means.

24. An apparatus in accordance with claim 23 wherein said wall means extends across the entire cross section of said housing means and has associated with it means to extend the heat leak path around said thermal switch means where it intersects said wall means.

25. An apparatus in accordance with claim 24 wherein said wall means has an opening and a valve plug operable within said opening whereby fluid communication between said evacuatable chambers may be controlled.

26. An apparatus in accordance with claim 23 wherein said walls means is of the same cross sectional configuration as said housing means, is mounted concentric therewith to define a spacing between it and the internal wall of said housing means and is affixed to said housing on one end across said spacing and has an end member on the other end which is intersected by said thermal switch.

27. An apparatus in accordance with claim 23 including valve-controlled fluid conduit means connecting said first and second evacuatable chambers.

28. An apparatus in accordance with claim 27 wherein said vacuum pumping means comprise mechanical pumping means connected with said second evacuatable chamber and cryopumping means located within said second evacuatable chamber.

29. An apparatus in accordance with claim 23 including a refrigeration load in thermal contact with said refrigeration-load heat station means.

30. An apparatus in accordance with claim 29 wherein said refrigeration load is low thermal mass cryopanel means.

31. An apparatus in accordance with claim 29 wherein said refrigeration load is an electronic component.

32. An apparatus in accordance with claim 29 wherein said refrigeration load is a spectrographic sample.

33. An apparatus for cooling a load, comprising in combination
   a. cryogenic refrigeration means having a refrigerator heat station;
   b. housing means defining an evacuatable chamber around at least that portion of said cryogenic refrigeration means which requires thermal insulation and providing a thermal barrier between said evacuatable chamber and its surroundings;
   c. refrigeration-load heat station means external of said evacuatable chamber and adapted for thermal connection to a refrigeration load;
   d. thermal switch means intersecting said thermal barrier, in fixed thermal contact with said refrigerator heat station and adapted to make controllable thermal engagement with said refrigeration-load heat station means and a load thermally connected thereto; and
   e. actuating means adapted to effect the controlled thermal engagement of said thermal switch means with said refrigeration-load heat station means.

34. An apparatus in accordance with claim 33 including auxiliary housing means adapted to define an auxiliary evacuatable chamber around said refrigeration-load heat station means and its associated load, said thermal barrier comprising a portion of said auxiliary housing means.

35. An apparatus in accordance with claim 34 including valve-controlled conduit means providing fluid communication between said evacuatable chamber in which said refrigeration means is located and said auxiliary evacuatable chamber.

36. A method for maintaining a refrigeration load at a controllable temperature, comprising the steps of
   a. providing an evacuated working zone around said load;
   b. maintaining said load in contact with a refrigeratable heat station within said working zone;
   c. providing a source of refrigeration in an evacuated auxiliary zone maintained separate and distinct from said working zone by a barrier; and
   d. transferring a controlled amount of refrigeration from said source of refrigeration to said refrigeratable heat station along a heat flow path which is in fixed thermal engagement with said source of refrigeration and which intersects said barrier separating said evacuated working zone from said auxiliary zone.

37. A method in accordance with claim 36 wherein said providing of an evacuated working zone and of an evacuated auxiliary zone comprises in part the cryopumping of residual gases after mechanical vacuum pumping on a cryogenically cooled cryopumping surface.

38. A method in accordance with claim 36 wherein said providing a source of refrigeration comprises cooling a heat station by a cryogenic fluid circulating in a mechanical refrigerator.

39. A method in accordance with claim 36 wherein said providing a source of refrigeration comprises cooling a heat station by circulating a cryogen fluid in contact therewith.

* * * * *